(12) United States Patent
Courouble et al.

(10) Patent No.: US 11,657,116 B2
(45) Date of Patent: May 23, 2023

(54) OVERRIDE RESOLUTION ENGINE

(71) Applicant: Shopify Inc., Ottawa (CA)

(72) Inventors: Thibaut Courouble, Ottawa (CA); Samuel Doiron, Bedford (CA); Nithin Bekal Sudhakar, Ottawa (CA)

(73) Assignee: Shopify Inc., Ottawa (CA)

( * ) Notice: Subject to any disclaimer, the term of this patent is extended or adjusted under 35 U.S.C. 154(b) by 21 days.

(21) Appl. No.: 16/436,442

(22) Filed: Jun. 10, 2019

(65) Prior Publication Data
US 2020/0387561 A1  Dec. 10, 2020

(51) Int. Cl.
*G06F 16/958* (2019.01)
*G06F 16/957* (2019.01)

(52) U.S. Cl.
CPC ........ *G06F 16/972* (2019.01); *G06F 16/9577* (2019.01)

(58) Field of Classification Search
CPC .......................... G06F 16/972; G06F 16/9577
USPC .......................................................... 715/234
See application file for complete search history.

(56) References Cited

U.S. PATENT DOCUMENTS

| | | | | |
|---|---|---|---|---|
| 6,067,551 A * | 5/2000 | Brown | ................... | G06Q 10/10 707/999.203 |
| 8,239,820 B1 * | 8/2012 | White | ................. | G06F 11/3688 717/126 |
| 2003/0014442 A1 * | 1/2003 | Shiigi | ....................... | G06F 8/20 715/255 |
| 2012/0079400 A1 * | 3/2012 | Nauerz | ................. | G06F 40/103 715/762 |
| 2016/0092404 A1 * | 3/2016 | Farouki | ................... | G06F 9/451 715/202 |
| 2016/0210275 A1 * | 7/2016 | Teevan | .................. | G06F 40/123 |

OTHER PUBLICATIONS

"InDesign Help / Master pages"; Adobe; <https://helpx.adobe.com/indesign/using/master-pages.html>; published Feb. 19, 2014 (Year: 2014).*
Duò, Matteo. "If I Update My WordPress Theme/Plugin, Will I Lose All My Customizations?" Codeable, Jul. 31, 2018, codeable.io/updating-wordpress-theme-plugin-without-losing-customization. (Year: 2018).*
"Child Themes (Twentyseventeen)." Make WordPress Training, May 31, 2017, make.wordpress.org/training/handbook/lesson-plans/theme-school/child-themes/child-themes-twentyseventeen/#why-use-a-child-theme. (Year: 2017).*

* cited by examiner

*Primary Examiner* — Stephen S Hong
*Assistant Examiner* — Broderick C Anderson
(74) *Attorney, Agent, or Firm* — Rowand LLP

(57) ABSTRACT

A computer-implemented method and system may include receiving at an e-commerce platform a change request that results in a master configuration change for rendering page data, where the master configuration change results in a change from a first master configuration to a second master configuration; determining by an override resolution engine, override data of the first master configuration that affects the second master configuration; and applying, by the override resolution engine, the determined override data to the second master configuration.

35 Claims, 4 Drawing Sheets

OVERRIDE RESOLUTION ENGINE

FIELD

The present disclosure relates generally to managing web-based content, and more specifically to presentation design for web-based content.

BACKGROUND

Presentation of web-based content through service applications is often aided by the use of presentation design templates that provide master configuration control for the presentation of content across multiple pages. A service provider may provide a user with different masters, such as in association with a variety of presentation themes the user may choose from. However, once a user has populated web pages with content utilizing one master, it is not easy to switch to an alternative or revised master without the content being changed, especially if the user has made manual changes to the pages as compared to the original master that must be accommodated in connection with the new master. Manual changes to web pages resulting from changing masters can be time consuming and burdensome for the user. There is a need for methods and systems that enable switching or changing master configurations that minimize the need to manually re-input and/or re-configure the presentation of content.

SUMMARY

In an aspect, a computer-implemented method may include receiving, at an e-commerce platform, a change request that results in a master configuration change for rendering page data, wherein the master configuration change results in a change from a first master configuration to a second master configuration; determining, by an override resolution engine, override data of the first master configuration that affects the second master configuration; and applying, by the override resolution engine, the determined override data to the second master configuration. In embodiments, the change request may be a request to change an online store theme from a first theme to a second theme. The change request may be a request to change a theme master from a first theme master to a second theme master. The change request may be a request to change a page master from a first page master to a second page master. The override data may be the result of a change to the first master configuration. The change to the first master configuration may be an added data element. The change to the first master configuration may be a removal of a data element. The change to the first master configuration may be a reordering of at least one data element of a plurality of data elements. The override data may be represented by a master override model that captures an intent of the change to the first master configuration. The override data may include a plurality of changes to the first master configuration, wherein the override resolution engine applies a weighting to determine an order for rules application with respect to the plurality of changes. The override resolution engine may further include determining a modifying characteristic of the override data; and applying a resolution rule to rendering the page data based on the second master configuration and the modifying characteristic. The modifying characteristic may be a type characteristic for at least one element of a plurality of page data elements and the resolution rule determines a placement of the at least one element amongst the plurality of page data elements based on the type characteristic. The modifying characteristic may be a placement characteristic for at least one element of a plurality of page data elements and the resolution rule determines a placement of the at least one element amongst the plurality of page data elements based on the placement characteristic. The resolution rule may be a placement based on a nearest neighbor analysis. The placement may be determined by an ordered position of the at least one element of the plurality of page data elements.

In an aspect a system may include an e-commerce platform comprising at least one processor, an override resolution engine, and at least one memory, the e-commerce platform adapted to: receive a change request that results in a master configuration change for rendering page data, wherein the master configuration change results in a change from a first master configuration to a second master configuration; determine, by the override resolution engine, override data of the first master configuration that affects the second master configuration; and apply, by the override resolution engine, the determined override data to the second master configuration. In embodiments, the change request may be a request to change an online store theme from a first theme to a second theme. The change request may be a request to change a theme master from a first theme master to a second theme master. The change request may be a request to change a page master from a first page master to a second page master. The override data may be the result of a change to the first master configuration. The change to the first master configuration may be an added data element. The change to the first master configuration may be a removal of a data element. The change to the first master configuration may be a reordering of at least one data element of a plurality of data elements. The override data may be represented by a master override model that captures an intent of the change to the first master configuration. The override data may include a plurality of changes to the first master configuration, wherein the override resolution engine applies a weighting to determine an order for rules application with respect to the plurality of changes. The override resolution engine may further include determining a modifying characteristic of the override data; and applying a resolution rule to rendering the page data based on the second master configuration and the modifying characteristic. The modifying characteristic may be a type characteristic for at least one element of a plurality of page data elements and the resolution rule determines a placement of the at least one element amongst the plurality of page data elements based on the type characteristic. The modifying characteristic may be a placement characteristic for at least one element of a plurality of page data elements and the resolution rule determines a placement of the at least one element amongst the plurality of page data elements based on the placement characteristic. The resolution rule may be a placement based on a nearest neighbor analysis. The placement may be determined by an ordered position of the at least one element of the plurality of page data elements.

In an aspect, a computer-implemented method may include displaying, in association with an e-commerce platform, on a merchant computing device, a graphical user interface for managing master configuration changes; receiving at the e-commerce platform, via the graphical user interface to the e-commerce platform a change request that results in a master configuration change for rendering page data, wherein the master configuration change results in a change from a first master configuration to a second master configuration; determining, by an override resolution engine of the e-commerce platform, override data of the first master configuration that affects the second master configuration; applying, by the override resolution engine, the determined override data to the second master configuration; and displaying a result of the applying the determined override data to the second master configuration. In embodiments, the result may be a display of an online store based on the second master configuration. The graphical user interface may further include a feedback input for providing corrections to the rendering of the page data. The graphical user interface may further display a confidence score associated with rendering the page data based on the second master configuration. The graphical user interface may further display a ranking of pages based on the second master configuration.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
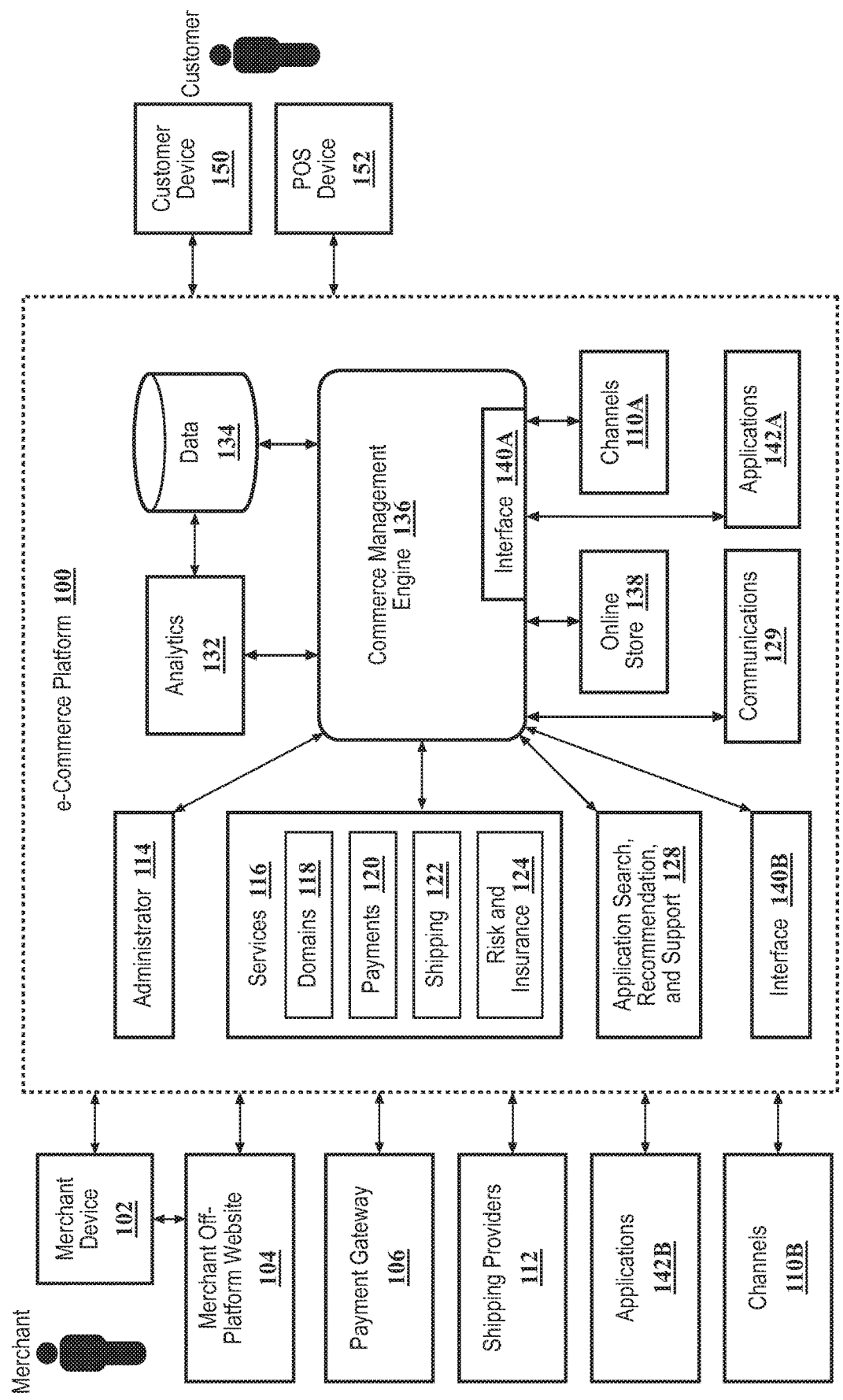
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
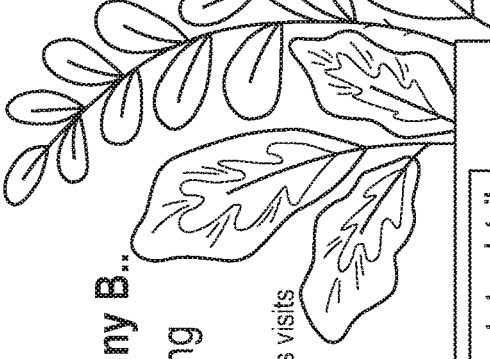
FIG. 2 depicts an embodiment for a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide online store users (e.g., merchants, developers, and the like) with a selection of themes or master configurations to aid in the standardization of presentation for content of online stores 138 (for example, for presenting products to customers). Master configurations, which hereafter may be referred to simply as masters, provide control of content configuration across multiple portions of the online store, such as across web pages, types of pages, types of sections, sections within a page, blocks of content, and the like. For instance, a company banner may be included across the top of every page in the online store, where a master determines the formatting of the banner for all pages. In this way consistency may be maintained and a user needing to change the banner only has to change the master to have the change appear on all pages of the online store. In another instance, a product page may have a product page master that determines the format for all product pages in the online store 138, such as where a product heading is followed by a product image and then followed by a product description. In embodiments, masters may also be assigned to sets of pages, rather than all pages at once, which may save administrative time (e.g., a user may have a master that shows a shoe sizing chart only on shoe product pages, saving the user from having to add it to each individual page). Masters save an administrating user of the online store time and effort when creating or changing content in pages that is common across multiple portions of the online store.

Masters can also be used in web applications other than online stores. For example, they may be used in connection with general web design applications such as websites, pages, or blogs that may not contain any commerce features. Although the following disclosure is in relation to online stores specifically, the principles described herein are not limited as such and are not meant to be limiting in any way. One skilled in the art will appreciate that they may be generally applied to any web design application.

In embodiments, a user may override a master through override changes (hereafter referred to as 'overrides'), such as at some hierarchical master level (e.g., theme master (or theme frame), page master (or master page), section master, and the like). Overrides may be applied to an online store theme master, individual page master, individual page, collection, blog post, custom page, and the like. For instance, a user may apply an override by adding sections in between a page master's sections or overriding the configuration of the page master's own sections. When a page or series of new pages is assigned a new master (as used herein a new master may be a revised version of a previous master), ideally as many of the overrides as possible should carry over to the new master. For instance, overrides that insert new sections should carry over in the rendering of the page through the new master. There is a need for an intelligent way to implement these changes so that user customizations are not unnecessarily undone when a master is changed.

Figure 3:
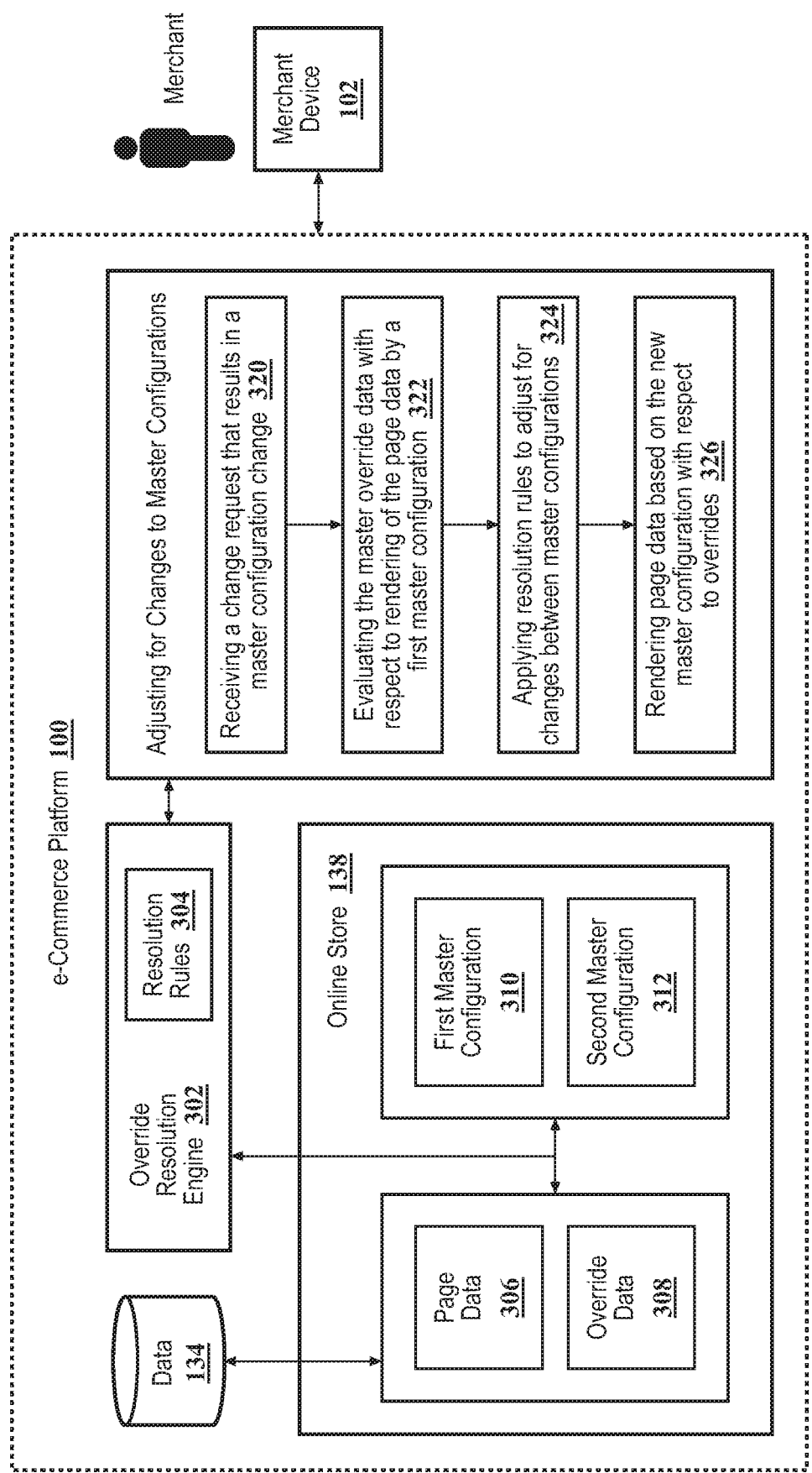
FIG. 3 depicts an embodiment functional-flow block diagram for an e-commerce platform with an override resolution engine.

Referring to FIG. 3, in embodiments the e-commerce platform 100 may provide for methods and systems for applying overrides made to a first master configuration 310 to a second master configuration 312 through an override resolution engine 302. In embodiments, the override resolution engine 302 may apply resolution rules 304 (hereafter referred to as 'rules') to the accommodation of override data 308 applied by a user to the first master configuration in the rendering of the page data through the second master configuration. In an embodiment example process flow, in a first step 320 the e-commerce platform 100 may receive a change request from a user that results in a master configuration change (e.g., changing from a first master configuration to a second master configuration), in a second step 322 the override resolution engine 302 may evaluate the master override data with respect to rendering of the page data by a first master configuration, in a third step 324 the override resolution engine 302 may apply resolution rules 304 to adjust for changes between the master configurations, and in a forth step 326 the e-commerce platform 100 may render the page data based on the new master configuration with respect to the override data 308. In embodiments, step 326 may include the e-commerce platform 100 rendering the page data based on the new master configuration and a rules-based adjustment. In embodiments, an alternate example process flow may proceed from step 320, to step 322, and then to step 326 without the application of explicit resolution rules 304 by the override resolution engine 302. In other embodiments, steps 322 to 326 in yet another alternative example process flow may be more generally viewed as determining or identifying override data 308 applied to an existing master configuration that affects the new master configuration and then applying the override data identified to the new master configuration.

In embodiments, the override resolution engine 302 may evaluate the override data 308 with respect to rendering of the page data 306 by a first master at the time the override is made by a user (e.g., recording and/or evaluating the actions and/or intentions by the user in making the change resulting in the override), where step 322 precedes step 320. Alternately, the override resolution engine 302 may evaluate the override data 308 at the time the e-commerce platform 100 receives a change request that results in the master configuration change (e.g., recording the actions associated with the override at the time the override was made, but waiting to evaluate the change until a change in master is called for), where step 322 follows step 320. In either instance the override resolution engine 302 is evaluating the override made by the user and then applying rules to accommodate those overrides within the new master if and when the user makes a change to cause a change in the master being utilized in rendering the page data 306. In embodiments, changes to the online store 138 by the user that results in an override to a master may be from changes made directly to a master (e.g., opening up a master configuration and making an explicit change, such as to the location of a theme master's online store banner) or from changes to the layout of a page by the user that results in a change to the master (e.g., changing the location of the banner while editing a page layout that impacts the theme master's positioning of a page master header).

In embodiments, override data 308 may include a log of overrides, such as keeping track of the context in which the overrides were made so as to best apply them even as the page master changes over time. Further, the override data log may be compacted over time to be as small as needed to satisfy the requirements for accommodating changes in masters. For instance, the e-commerce platform 100 may execute much of the compacting as overrides are recorded. For example, following an insertion of a section as an override, every change made to that section may be merged into the same override. The override log may also be compacted because certain overrides do not apply anymore, for example if the page master was updated since the last update to the page. In embodiments, updates to masters may not automatically update the overrides of the pages that use it, as that may require excessive background processing (e.g., a page master could be used by thousands of pages). In embodiments, the combination of the page data 306 and overrides data 308 for a particular page may be cached at the time the page is rendered.

In embodiments, a master may be implemented at different levels of control for the rendering of web content, such as at hierarchical levels. For instance, masters may be created as a top-level template for an online store 138, such as in a theme master (e.g., includes content such as header and footer to be shown on areas of a website), a page master (e.g., includes content to be shown on groups of pages like product pages), a type of page (e.g., product pages), individual pages (e.g., includes content to be shown in sections on individual pages), and the like. In embodiments, web content on pages may be organized in sections or in blocks of content, and these organization units used in the layout control through masters. For instance, sections may include major units within a page, blocks of content may be nested content units within section, and so forth. Although embodiments described herein refer generally to pages organized in sections, one skilled in the art will appreciate that any organizational unit may be applied to the use of masters and the rules applied by the override resolution engine 302 to accommodating changes to masters, such as through blocks of content, lines of content, and the like.

In embodiments, a web page may provide for sections, such as a section for a company name, a section for displaying a series of offered products (e.g., a sliding gallery of products, a slideshow of products, and the like), a section with site navigation links (e.g., products, product collections, search, payment and checkout, and the like), a section with a banner including corporate name and disclaimers, and the like. Segmentation of online store pages into a customizable selection of sections or segments allows the specification of section functions (e.g., placement, layout, format, and the like) for presentation of online store content and information on the page within the presentation look and feel of the selected theme.

Web content may be organized through online store themes that represent a set of rules that dictate how sections and section data will be presented on a page, such as a web page, and functions as a presentation layer that may include presentation options or parameters. In embodiments, themes may include one or more sections files, where a theme may be viewed as a set of section files, with additional files to support those section files (e.g., global configuration files, global assets such as images, translation data, and the like). Sections may be customizable blocks that determine the layout of different pages presented on an online store, such as an item of information or content or a container for an item of information or content and information regarding the presentation of that information/content. Sections may be rendered as elements of a page, such as a webpage. For instance, sections may be full-width portions of a web page, such as a header, footer, slideshow, image gallery, and the like. Section files may contain templating code to generate the Hypertext Markup Language (HTML) for that portion of the page. Section files may also include configuration data, such as for configuring the customization options for a section. A user may use sections to modify the content and layout of different pages on the online store, as well as using settings to customize an online store's appearance (e.g., changes to fonts and colors, social media links, and checkout settings). In embodiments, each type of page (e.g., display element or region of displayed elements) may have its own section layout (e.g., each section with associated section data). For example, a product page section may determine the layout of each product page on an online store. Page sections may be located in specific places, where the user may then customize the sections to different degrees dependent on section configuration constraints.

In embodiments, sections may be classified by type. For example, a user would likely prefer a banner section to stay at the top of the page. This may be taken into account where different sections receive different treatment based on the section's type. In embodiments, a type may be specified, introspected or inferred from the type of content the section accepts or the kind of presentation settings it has, known from performing section matching, learned through machine learning to have a model that identifies the type, and the like. In embodiments, a type may be 'other' or 'undefined' so the concept is not limited.

In embodiments, the e-commerce platform 100 may provide for different masters for managing the presentation of web content in an online store 138. Users may also switch masters, such as through an express selection (e.g., a user selecting an alternate master) or more indirectly through some action (e.g., changing the theme for the user's online store that results in a change in master(s) because the themes utilize different masters). Utilizing an alternate master allows a user to modify the way content is shown on the online store, but only for the products, collections, blogs, and other pages that the master is applied to. For instance, a user may utilize or create an alternate product master that has no 'add to cart button' and apply it only to products that are not for sale. In another instance, a user may utilize or create an alternate page master that does not include a header and apply it to a selection of the online store's pages.

At a top level, a user may utilize a theme master to manage the presentation of content that is common across the online store 138 (or sections of the online store). For instance, a theme master may provide a set of top page sections and bottom page sections for application on multiple (or all) pages by a theme. A theme master may be a configuration of sections (e.g., a header and footer) to display around the content of a page. The theme master, and the use of masters in general, may create layout structure that enables a user to customize masters, such as through a user interface (e.g., by adding and removing sections). In embodiments, at least one theme master may be identified as a default theme master, such as used by all pages. Page masters may be a set of sections to be applied on multiple pages, such as belonging to an online store (e.g., not stored inside a theme). Page masters may be online store resources that can be created, deleted, and modified, such as through a user interface. Like pages, page masters may exist independently of themes. Section masters, page masters, and the like, may be used in conjunction with theme masters.

In embodiments, an online store 138 may be organized by pages, and pages may be organized in sections, and there may be different types of pages (e.g., product page, collection page, custom page, canonical page, home page, and the like). Some pages may have a master applied to it (e.g., product pages and collection pages) and some may not (e.g., custom and system pages (also referred to as 'built-in' pages, which are one-off pages such as a cart page or search page)). Pages that have page masters applied to them may include overrides, which may include new sections, but also other types of customization, such as changing a setting of a page master section from one value to another. But ultimately when a page is rendered it is made of a list of sections, and the rendering of those sections may be controlled by one or more masters.

The following is an example product page controlled through different hierarchical masters (e.g., theme master and page master), where in this instance each listed item is a section, and all those sections combined make up the entire content of the page:

Header (e.g., part of the theme master)
Product information (e.g., part of the page master)
Image gallery (e.g., part of the individual page)
Sizing chart (e.g., part of the page master)
Text content (e.g., part of the individual page)
Product reviews (e.g., part of the page master)
Footer (e.g., part of the theme master)

In this example, the 'header' and 'footer' may be controlled as part of a theme master, which may for instance include sections to show before and after the content of pages. Some pages could have a different header/footer (e.g., a sidebar) or no header/footer. The 'product information', 'sizing chart', and 'product reviews' may be controlled as part of a page master and may represent sections to be shown on multiple pages. For instance, these sections may go between the top and bottom sections of the theme master. Unlike the other items in the list, the 'image gallery' and 'text content' may be attached to the individual page. These are not a 'list of sections' like in the two hierarchical levels above (theme master and page master), because the individual page may be able to override anything in the sections of the page master, as well as insert sections in between the sections of the page master. These sections may be modeled as 'overrides', where an override could be a change to the setting of a page master section from one value to another, or to insert a section at a certain position. At the highest level of generality, an override may be any change to any master by the user, at any master level. For instance, a user could override the footer format throughout the website (e.g., an override to the theme master) or to a footer on a group of pages (e.g., an override to a page master) or to a footer on an individual page.

In embodiments, the e-commerce platform 100 may provide a contextual data model to capture override data 308, such as at the page level. The contextual data model may capture the content, intent, context, and the like, of an override. For example, a shipping option section for a particular product page may be changed from 3 days to 5 days, where the intent is to allow for more time because the product is particularly fragile. The contextual data model may be split between the pages and page masters, which contain the page data 306 and override data 308 (e.g., including context information in which the overrides were made), and section files, which may contain information such as the type of a section. In embodiments, page data 306 and override data 308 may be stored at the page level, such as including data associated with tracking the context in which the override is made. Returning to the example of a product page controlled through different hierarchical masters, when inserting the 'text content' section on an individual page between the 'sizing chart' and 'product reviews' sections of the page master, the override resolution engine may consider the override data including that the section was inserted in the fourth position (at the time it was added to the individual page), the section was inserted after the 'sizing chart' and "product information" sections of the page master, the section was inserted before the 'product reviews' section of the page master, the section was inserted after the 'image gallery' section of the individual page, and other potential considerations, such that if the sections of the page master are reordered (after the override is made), the override resolution engine 302 may optimize the placement of the 'text content' section on the individual page, as close to the user's original intent as possible.

In embodiments, the override resolution engine 302 may employ an algorithm that captures pre-determined rules, such as applied to the positioning of sections with respect to other sections, types of sections, and the like. For instance, a rule may determine that a product reviews type of section always goes at the bottom of the page. The algorithm may determine when the instructions of a higher-level page (such as a master) should not be followed for a particular page, such as based on the overrides and pre-determined rules. In an example, the inputs to the algorithm may include page data 306 of the page master (e.g., a list of sections plus configuration data of each section), the override data 308 (e.g., list of overrides) of the individual page, and the like. The outputs of the algorithm may include section data with the overrides of the individual page applied in the most appropriate way (e.g., per the user's intent) in combination with the section data of the page master. The outputs may allow individual pages to override theme master level sections as well. In an example, rules may be applied to overrides such as (1) inserting a section before, in-between, or after the sections of the page master; (2) changing a setting of a section of the page master (for example, to show an 'on sale' badge in the 'product information' section of a specific page); (3) adding a block of content (e.g., an image) to a section of the page master; (4) removing a block of content on a section of the page master; and the like. The rules applied by the override resolution engine 302 may be specific to a type, such as to an 'insert section' or 'insert block' type of override where the override resolution engine 302 has to resolve the position of the added object. The rules for other types of overrides, such as (2) and (4) may be more straightforward, where if the section or block in question still exists in the page master, then the override resolution engine 302 applies the override in question. Overrides such as (1) and (3) may require more complicated rules because the order of the sections in the page master (and blocks in the sections of the page master) may change over time.

In embodiments, the override resolution engine 302 may apply weighting to the application of rules to different sections, overrides, algorithm results, and the like. Weighting may be applied to different sections, done automatically or stored in a look-up table, updated dynamically (e.g., based on the previous experiences with users), consider types of sections, and the like.

In embodiments, the override resolution engine 302 may enable a process for corrections, such as when the algorithm generates a result that is not preferred (e.g., doesn't look good to the user) where the user is able to make corrections (e.g., through a user interface). In embodiments, corrections made by users may be used to update the contextual data model. In embodiments, the override resolution engine 302 may learn from these corrections (or lack of corrections) over time, such as through a machine learning engine associated with the override resolution engine 302.

In embodiments, the override resolution engine 302 may apply rules in association with page data 306 and override data 308, such as in a type analysis, a nearest neighbor analysis, an indexing analysis, and the like. The override resolution engine 302 may apply rules with respect to an order, with a weighting, and the like, and determine an output layout based on one or more rules in a preferred order or with a preference for one rule over another rule. For instance, when a section of type 'banner' is added at the top or bottom of a page or page master, the algorithm may try to keep it at the top or bottom even when that conflicts with a standard positioning rule. In another instance, the order of the sections added to a specific page may be retained even when that conflicts with a standard positioning rule. In embodiments, the override resolution engine 302 may perform multiple 'passes through a rules-based process, where the ordering is optimized after each pass.

In an example of the application of a type analysis rule, where placement is based on the type of section (e.g., where does the section 'want to' go?), say a page master has the following sections:
 (A) Product information
 (B) Product reviews
On a specific product page, the user adds a 'rich text' section describing the product in more detail, so the page looks like this:
 (A) Product information
 (C) Rich Text
 (B) Product reviews
Then the user adds a new '3$^{rd}$ page master section' to the page master, so the page master now has the following sections:
 (A) Product information
 (D) 3$^{rd}$ page master section
 (B) Product reviews
Based on a type rule, if (D) is a 'product recommendations' or 'sizing chart' type section, the algorithm may render the product page as such:
 (A) Product information
 (C) Rich text
 (D) 3$^{rd}$ page master section
 (B) Product reviews
However, if (D) is a 'product media gallery' or a 'banner' type of section, the algorithm may render the product page as such:
 (A) Product information
 (D) 3$^{rd}$ page master section
 (C) Rich text
 (B) Product reviews
This is because 'product recommendations' and 'sizing chart' are types of sections that are generally best positioned toward the bottom of pages, after the description of the product (which can be made of multiple sections), whereas 'product media gallery' and 'banner' are types of sections which when positioned next to the product information, are generally intended to stay positioned next to that, ahead of the product-page-specific sections describing the product.

A nearest neighbor analysis is another rule the override resolution engine 302 may utilize in managing overrides. In a nearest neighbor analysis, the override resolution engine 302 may use position or order of sections as an indication of where the section should be placed (e.g., where preference is given to sections above then to below, preference to sections below then to above, preference to sections to the left then to the right or right and then to the left (e.g., in the case of columns of text, or when applying rules based on edge distance)), use of distances (e.g., vertical, horizontal, diagonal or other distance, index position distance, or pixel distance), use of proximity associated with the position of a new section relative to other sections (e.g., applying more weight to sections below or above), and the like. In embodiments, nearest neighbor analysis may consider multiple neighbors. For instance, for each newly added section, the override resolution engine 302 may find the nearest neighbor above and then insert the section below that. The nearest neighbor above might have been deleted on the master, and in that case the override resolution engine 302 may find the nearest neighbor below it and insert it above that section. If the neighbor below is missing, the override resolution engine 302 may find the next nearest section above and insert below, and so on, where the override resolution engine 302 may iteratively apply one or more rules until a placement is made. In embodiments, nearest neighbor analysis may utilize weighting in association with the application of the rules, such as where machine learning is applied (e.g., for making adjustments to the weights as feedback is processed).

In an example of the application of a nearest neighbor analysis, where placement is based on inserting a section with respect to a nearest neighbor, say the master has the following sections:
Product
Sizing chart
Slideshow
Product reviews If a 'rich text' section is inserted below 'sizing chart', the override resolution engine 302 may implement the following pattern if sections on the master are deleted or moved: (1) insert below the 'sizing chart' if the 'sizing chart' is present, (2) if 'sizing chart' is deleted, insert above 'slideshow', and (3) if both sections above are deleted insert below 'product'.

An indexing analysis is another rule the override resolution engine 302 may utilize in managing overrides, where indexing is the order position of a section. For instance, a new section may have been inserted to become the fourth of five sections oriented vertically down a page or horizontally across a portion of a page. The override resolution engine 302 may utilize this indexed position data in placing the new section. In general, as used throughout, in embodiments, references to above and below may be to left and right, references to vertical placement may be to horizontal, diagonal or other placement, and the like. In addition, in general, as used throughout, in embodiments, placement references may be mixed. For example, a section or element may be below another section or element, to the left of another section or element and diagonally adjacent to another section or element.

In embodiments, an iterative multi-pass process may be applied to the application of rules to the placement of a section, such as applying type analysis, then nearest neighbor analysis, and finally indexing; or applying nearest neighbor analysis, then type analysis, and then indexing; or applying indexing, then nearest neighbor analysis, and then type analysis; and so on. The override resolution engine 302 may then make subsequent passes, such as with the same or different order, with specific rules or rules in combination, and the like. The override resolution engine 302 may choose the order and/or multiple passes of applied rules based on what has worked best in the past (e.g., through machine learning), based on a stored preference (e.g., from a user), based on a master type (e.g., a theme master vs. a page master), based on a layout configuration (e.g., placement in the middle of a group of sections vs. placement at the top or bottom), and the like. For instance, the override resolution engine 302 may examine for type first but fall back to nearest neighbor analysis. For example, suppose the added section is an on-sale banner. If a banner and an announcement are the same type of section (where the banner is an image and the announcement is text), and each is typically placed at the top of the page, type does not determine where to place the on-sale banner with respect to an announcement. So, the override resolution engine 302 may fall back and examine the position of the two (not necessarily what is below and above) and make the determination based on nearest neighbor. In embodiments, the override resolution engine 302 may have a default or preferred priority order for applying rules. In a non-limiting example, a priority may be (1) position based on proximity to other section, such as using nearest neighbor analysis or using a pixel distance for determining proximity, (2) then evaluate based on type analysis, (3) then evaluate based on index position, and (4) iterate as necessary through the steps. One skilled in the art will appreciate that the override resolution engine 302 may apply rules and order of application rules in a variety of ways in managing the migration of overrides to a new master configuration.

The following presents additional examples of the override resolution engine 302 applying rules to the placement of sections in the application of overrides, such as where the override resolution engine 302 applies rules to an override with respect to a section placement (e.g., an image gallery is the override, and the override resolution engine determines this section was below the on sale banner on the product page), prioritizes sections below first and then above (e.g., there are three sections, then an announcement section is added on the top, where the override resolution engine needs to determine where the on-sale banner goes, such as looking to sections below first, determining it was not below another section but above a product page section, so place it there), and the like. Or where the override resolution engine 302 applies rules to prioritize type, such as where an announcement section was added, and was a type of product information section. In this instance, the override resolution engine 302 may perform an evaluation on the type of content the section accepts (which may be known from the model data), perform an evaluation on a type field in the section schema (e.g., a developer may pre-determine the type, and the engine has a list of types, e.g., banner, announcement, slide show, gallery, grid, which would determine the purpose of the section), and place the section based on a combination of the section content and the way the content is presented, such as stored in page data 306 (e.g., presentation data).

Other examples follow:

Inserting a Section:

In an example, a section is added on a product page. In this instance, on a specific product page, the user has added an 'image gallery' after a 'product page' section, such as depicted in Table 1.

TABLE 1

| Inserting a Section | | |
|---|---|---|
| Master | Page | Rendered |
| On sale banner | On sale banner | On sale banner |
| Product | Product | Product |
| Sizing chart | Image gallery | Image gallery |
| Product reviews | Sizing chart | Sizing chart |
| | Product reviews | Product reviews |

The override resolution engine 302 may model this operation as:

```
{
   section: 'image-gallery',
   below: ['on-sale-banner', 'product-page-section'],
   above: ['sizing-chart', 'product-reviews']
}
```

To build the list of sections to render, override resolution engine 302 may follow the following set of rules:
Prioritizing the sections by distance from a current section and prioritizing the section above over the one below when both are at equal distance.
This provides a priority of positions where sections could be inserted as follows:
Below product section
Above sizing chart
Below on sale banner
Above product reviews
This priority may be used to find a fallback position in the instance when a section has been deleted on the master.
Insert Above All Sections:
In an example, a master is updated with a new 'announcement' section introduced at the top of the list, while a new 'on sale banner' is added to the page above the 'product' section, such as depicted in Table 2.

TABLE 2

Insert above all sections

| Master | Page | Updated master | Rendered |
| --- | --- | --- | --- |
| Product | On sale banner | Announcement | Announcement |
| Sizing chart | Product | Product | On sale banner |
| Product reviews | Sizing chart | Sizing chart | Product |
| | Product reviews | Product reviews | Sizing chart |
| | | | Product reviews |

The override resolution engine 302 may model this operation as:

```
{
   section: 'on-sale-banner',
   below: [ ],
   above: ['product-page-section', 'sizing-chart', 'product-reviews']
}
```

By following the rules stated in the previous example, the override resolution engine 302 inserts the 'announcement' at the top (below '[ ]'—below nothing), and the 'on sale banner' above the 'product' page section.
Conflicting Section Insertions at the Same Point:
In an example, if the section is inserted at a position and then the master is updated to insert a section at the same position, the override resolution engine 302 may apply a rule or set of rules that prioritizes an order of insertion to first insert the newly added section from the master, and then insert the new section from the page overrides, such as depicted in Table 3. In embodiments, the rule here may consider ordering and index position. For example, the override resolution engine 302 may first apply an order rule that determines the inserted 'rich text' section that was inserted after 'sizing chart' in the page override is to be maintained in that order in the rendered page. The override resolution engine 302 may then apply an index position rule to determine that 'sizing chart' is in the second position in both the master and page and so maintains the position of 'sizing chart' in the second position, followed by 'rich text' as previously determined to follow 'sizing chart'. Thus, the rendered order of sections as presented in Table 3 showing 'sizing chart' in the second position followed by 'rich text'.

TABLE 3

Conflicting section insertions at the same point

| Master | Page | Rendered |
| --- | --- | --- |
| Product | Product | Product |
| Sizing chart | Sizing chart | Sizing chart |
| Image | Rich text | Rich text |
| Product reviews | Product reviews | Image |
| | | Product reviews |

Master Reordered and a New Section Added to Page:
In an example, the sections in a master may be reordered, and a new section added to a page resulting in a conflict. In this instance, the updated master moves the position of the 'slideshow', and the new 'rich text' section was added after the slideshow. The override resolution engine 302 may then apply a rule or set of rules to maintain the reordering of the position of 'Slideshow' from the updated master and then position the new 'Rich text' section following the slideshow from the page override, such as depicted in Table 4. In embodiments, the rule here may consider the nearest neighbor and index position. For example, the override resolution engine 302 may first apply a nearest neighbor rule to determine that the inserted 'rich text' has a nearest neighbor in the page override to be above 'slideshow' and so maintains 'slideshow' to be above 'rich text' in the rendered page. The override resolution engine 302 may then apply an index position rule to maintain 'slideshow' in the first position as in the updated master, followed by 'rich text' as previously determined to follow 'slideshow'. Thus, the order of sections as presented in Table 4 showing the rendered page starting with 'slideshow' and then followed by 'rich text'.

TABLE 4

Master reordered and a new section added to page

| Master | Page | Updated master | Rendered |
| --- | --- | --- | --- |
| Product | Product | Slideshow | Slideshow |
| Slideshow | Slideshow | Product | Rich text |
| Sizing chart | Rich text | Product reviews | Product |
| Product reviews | Sizing chart | Sizing chart | Sizing chart |
| | Product reviews | | Product reviews |

Master Reordered New Sections Added to the Both Master and Page:
In an example, the sections in a master may be reordered, and a new section added to both the master and to a page. In this instance, the updated master reorders the sections and adds the new 'newsletter' section, and a new 'image' section was added after the 'rich text' in a page override. The override resolution engine 302 may apply a rule or set of rules to maintain the page ordering and maintain the position the new 'image' section following the 'rich text' section from the page override and the position of the new 'newsletter' section following the 'sizing chart' section from the updated master, such as depicted in Table 5. In embodiments, the rule here may consider the nearest neighbor and index position. For example, the override resolution engine 302 may first apply a nearest neighbor rule to both inserted sections based on the new section 'newsletter' having a nearest neighbor above in the updated master to be 'sizing chart' and the new section 'image' having a nearest neighbor above in the page override to be 'rich text'. Note that in another example embodiment the override resolution engine 302 could have applied a nearest neighbor below rule, such as where a nearest neighbor below the inserted 'image' section in the page override is determined to be 'slideshow' which is then maintained in the rendered page with 'slideshow' below 'image'. The override resolution engine 302 may then apply an index position rule to prioritize the index positioning in the page override to that of the updated master, where 'product' is listed first, 'rich text' is listed second, and so forth, with 'image' following 'rich text' and 'newsletter' following 'sizing chart' as previously determined. Thus, the order of rendered sections as presented in Table 5.

TABLE 5

Master reordered new sections added to the both master and page

| Master | Page | Updated master | Rendered |
|---|---|---|---|
| Product | Product | Product | Product |
| Sizing chart | Rich text | Slideshow | Rich text |
| Slideshow | Image | Product reviews | Image |
| Product reviews | Slideshow | Sizing chart | Slideshow |
| Rich text | Sizing chart | Newsletter | Sizing chart |
|  | Product reviews | Rich text | Newsletter |
|  |  |  | Product reviews |

Multiple Sections Added on Page and Sections Moved on Master:

In an example, page master sections may be swapped (e.g., 'slide show' and 'sizing chart'), and multiple new sections may get added to the page ('rich text 2' and 'rich text 2'). In this instance, the override resolution engine 302 may apply a rule or set of rules to maintain the swap in the page master and the relative positions of the new sections, as depicted in Table 6. In embodiments, the rule here may consider the type of section. For example, the override resolution engine 302 may first apply a nearest neighbor rule to the swapped sections but then apply a type rule to determine if the inserted sections in the page override are appropriate. For instance, it may be determined through application of a type rule that a section with type 'rich text' is appropriate to follow both a 'slideshow' section and a 'sizing chart' section. Thus, the positioning of those sections based on the nearest neighbor rule are maintained in the rendering of the page as presented in Table 6. Note that in another example embodiment, the type rule may have changed the result of the nearest neighbor rule. Further, as a result of the changed result the override resolution engine 302 may iterate through the applications of the rules again to determine if further adjustments should be made.

TABLE 6

Multiple sections added on page and sections moved on master

| Master | Page | Updated master | Rendered |
|---|---|---|---|
| Product | Product | Product | Product |
| Slideshow | Slideshow | Sizing chart | Sizing chart |
| Sizing chart | Rich text 1 | Slideshow | Rich text 1 |
| Product | Sizing chart | Product | Slideshow |

TABLE 6-continued

Multiple sections added on page and sections moved on master

| Master | Page | Updated master | Rendered |
|---|---|---|---|
| reviews | Rich text 2 | reviews | Rich text 2 |
|  | Product reviews |  | Product reviews |

In embodiments, once the override resolution engine 302 makes a placement the override resolution engine 302 may calculate a confidence score as an indication of the confidence in the placement of a section. The confidence score may be presented to the user through a user interface that manages changes made as a user makes changes (e.g., show a confidence indicator, number, graphic or color, and the like). In embodiments, the user interface may show low confidence ones up front in a stack for review by the user for ease of viewing. In embodiments, the override resolution engine 302 may rank and/or sort placements made, such as pages that are affected by changes to a master that could be provided to the user through a user interface that provides ranking and sorting functions that enable the user to more easily review changes. For instance, order ranking may be by complexity, confidence, similarity, and the like. For example, suppose a change has been made that affects a home page, a sizing page, and fifty product pages. If all fifty product pages are affected in a similar way, the user interface may sort the pages to show the home page, the sizing page, and a 'stack' of product pages with one typical example of a product page on top, such as shown as 'Page 2' in FIG. 4 where a stack of pages (e.g., stack of product pages) is displayed for user review. Now the user may only need to review three pages to know the overall changes. In embodiments, the user interface may highlight a page once an override has been executed, such as showing where the override is located.

Figure 4:
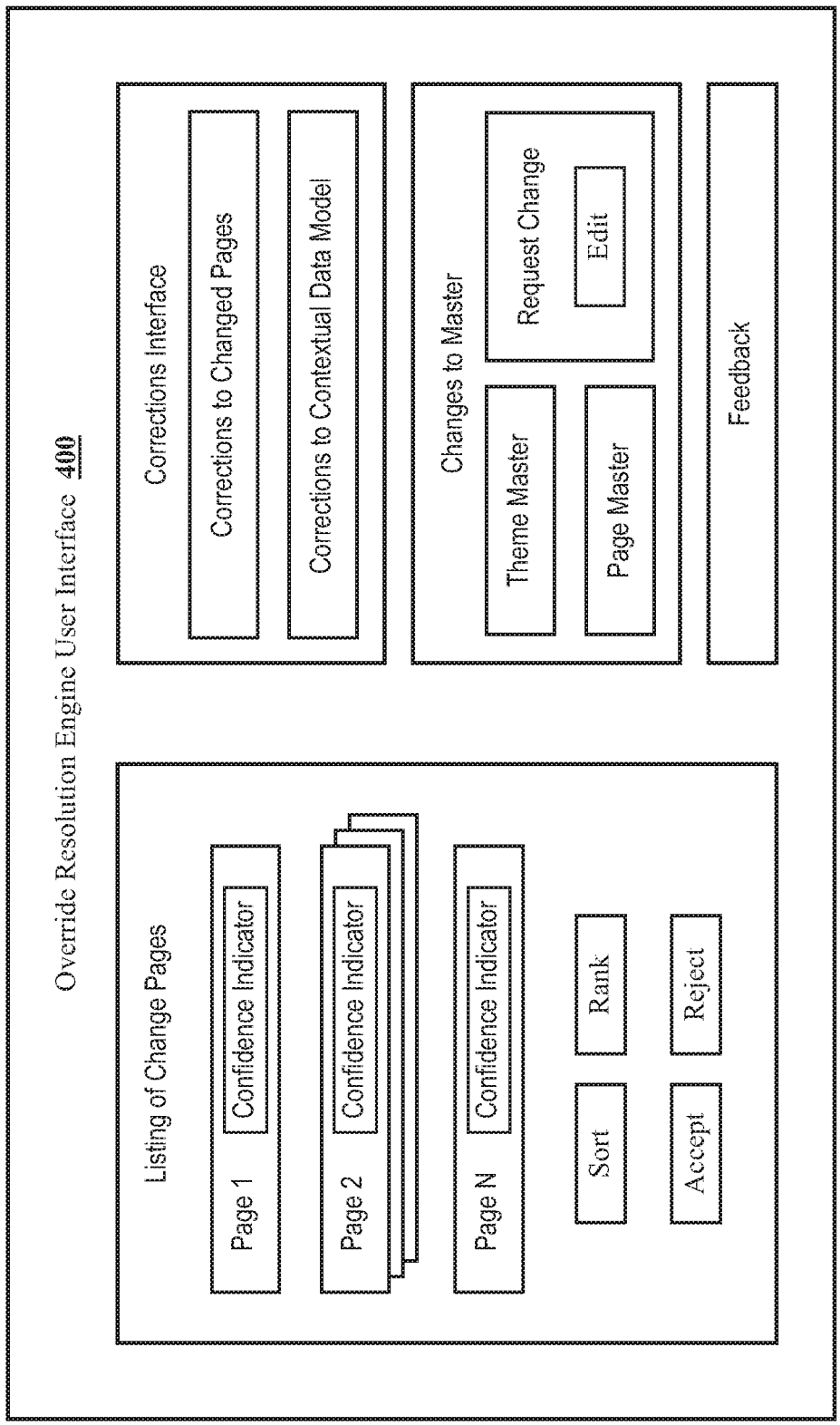
FIG. 4 depicts an embodiment for an override resolution engine user interface.

Referring to FIG. 4, in embodiments an override resolution engine user interface 400 may be provided, such as to provide access to pages that have undergone changes through the override resolution engine 302 (e.g., through a list of change pages) including sorting, ranking, accepting, and rejecting functions associated with changes; a corrections interface for correcting changed pages and/or making corrections to a contextual data model; an interface for making changes to masters (e.g., theme master or page master); an interface for a user to provide feedback to the override resolution engine 302; and the like.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
   receiving, at an e-commerce platform, a change request that results in a theme master file change for rendering page data, wherein the theme master file change results in a switch from a first theme master file to an alternative second theme master file;
   identifying override data within the first theme master file, wherein the override data is a result of a change to the first theme master file;
   analyzing, by an override resolution engine, the override data in the first theme master file to identify override data to carry over from the first theme master file to the second theme master file; and
   applying, by the override resolution engine, the identified override data to the second theme master file so as to change at least one element of the second theme master file without replacing the second theme master file with the first theme master file.

2. The method of claim 1, wherein the change request is a request to change an online store theme master file.

3. The method of claim 1, wherein the change request further results in a change of a theme master configuration from a first theme master configuration to a second theme master configuration.

4. The method of claim 1, wherein the change request further results in a change of a page master from a first page master to a second page master.

5. The method of claim 1, wherein the change to the first theme master file is an added data element.

6. The method of claim 1, wherein the change to the first theme master file is a removal of a data element.

7. The method of claim 1, wherein the change to the first theme master file is a reordering of at least one data element of a plurality of data elements.

8. The method of claim 1, wherein the override data is represented by a master override model that captures an intent of the change to the first theme master file.

9. The method of claim 1, wherein the override data comprises a plurality of changes to the first theme master file, wherein the override resolution engine applies a weighting to determine an order for rules application with respect to the plurality of changes.

10. The method of claim 1, further comprising the override resolution engine:
determining a modifying characteristic of the override data; and
applying a resolution rule to rendering the page data based on the second theme master file and the modifying characteristic.

11. The method of claim 10, wherein the modifying characteristic is a type characteristic for at least one element of a plurality of page data elements and the resolution rule determines a placement of the at least one element amongst the plurality of page data elements based on the type characteristic.

12. The method of claim 10, wherein the modifying characteristic is a placement characteristic for at least one element of a plurality of page data elements and the resolution rule determines a placement of the at least one element amongst the plurality of page data elements based on the placement characteristic.

13. The method of claim 12, wherein the resolution rule is a placement based on a nearest neighbor analysis.

14. The method of claim 12, wherein the placement is determined by an ordered position of the at least one element of the plurality of page data elements.

15. A system comprising:
an e-commerce platform comprising at least one processor, an override resolution engine, and at least one memory, the e-commerce platform adapted to:
receive a change request that results in a theme master file change for rendering page data, wherein the theme master file change results in a switch from a first theme master file to an alternative second theme master file;
identify override data within the first theme master file, wherein the override data is a result of a change to the first theme master file;
analyze, by the override resolution engine, the override data in the first theme master file to identify override data to carry over from the first theme master file to the second theme master file; and
apply, by the override resolution engine, the identified override data to the second theme master file so as to change at least one element of the second theme master file without replacing the second theme master file with the first theme master file.

16. The system of claim 15, wherein the change request is a request to change an online store theme master file.

17. The system of claim 15, wherein the change request further results in a change of a theme master configuration from a first theme master configuration to a second theme master configuration.

18. The system of claim 15, wherein the change request further results in a change of a page master from a first page master to a second page master.

19. The system of claim 15, wherein the change to the first theme master file is an added data element.

20. The system of claim 15, wherein the change to the first theme master file is a removal of a data element.

21. The system of claim 15, wherein the change to the first theme master file is a reordering of at least one data element of a plurality of data elements.

22. The system of claim 15, wherein the override data is represented by a master override model that captures an intent of the change to the first theme master file.

23. The system of claim 15, wherein the override data comprises a plurality of changes to the first theme master file, wherein the override resolution engine applies a weighting to determine an order for rules application with respect to the plurality of changes.

24. The system of claim 15, further comprising the override resolution engine:
determining a modifying characteristic of the override data; and
applying a resolution rule to rendering the page data based on the second theme master file and the modifying characteristic.

25. The system of claim 24, wherein the modifying characteristic is a type characteristic for at least one element of a plurality of page data elements and the resolution rule determines a placement of the at least one element amongst the plurality of page data elements based on the type characteristic.

26. The system of claim 24, wherein the modifying characteristic is a placement characteristic for at least one element of a plurality of page data elements and the resolution rule determines a placement of the at least one element amongst the plurality of page data elements based on the placement characteristic.

27. The system of claim 26, wherein the resolution rule is a placement based on a nearest neighbor analysis.

28. The system of claim 26, wherein the placement is determined by an ordered position of the at least one element of the plurality of page data elements.

29. A computer-implemented method comprising:
displaying, in association with an e-commerce platform, on a merchant computing device, a graphical user interface for managing theme master file changes;
receiving at the e-commerce platform, via the graphical user interface, a change request that results in a theme master file change for rendering page data, wherein the theme master file change results in a switch from a first theme master file to an alternate second theme master file;
identifying override data within the first theme master file, wherein the override data is a result of a change to the first theme master file;
analyzing, by an override resolution engine of the e-commerce platform, the override data in the first theme master file to identify override data to carry over from the first theme master file to the second theme master file;
applying, by the override resolution engine, the identified override data to the second theme master file so as to change at least one element of the second theme master file without replacing the second theme master file with the first theme master file; and
displaying a result of the applying the identified override data to the second theme master file.

30. The method of claim 29, wherein the result is display of an online store based on the second theme master file.

31. The method of claim 30, the graphical user interface further comprising a feedback input for providing corrections to the rendering of the page data.

32. The method of claim 29, the graphical user interface further displaying a confidence score associated with rendering the page data based on the second theme master file.

33. The method of claim 29, the graphical user interface further displaying a ranking of pages based on the second theme master file.

34. The method of claim 29, wherein the change to the first theme master file is an added data element.

35. The method of claim 29, wherein the change to the first theme master file is a removal of a data element.

\* \* \* \* \*